US007775578B2

(12) United States Patent
McDermott

(10) Patent No.: US 7,775,578 B2
(45) Date of Patent: Aug. 17, 2010

(54) REMOVABLE POWER SEAT CONNECTOR

(75) Inventor: Daniel T. McDermott, Fontana, CA (US)

(73) Assignee: Intier Automotive Inc., Newmarket, Ontario (CA)

( * ) Notice: Subject to any disclaimer, the term of this patent is extended or adjusted under 35 U.S.C. 154(b) by 60 days.

(21) Appl. No.: 12/304,541

(22) PCT Filed: Jul. 5, 2007

(86) PCT No.: PCT/CA2007/001199

§ 371 (c)(1),
(2), (4) Date: Dec. 12, 2008

(87) PCT Pub. No.: WO2008/003179

PCT Pub. Date: Jan. 10, 2008

(65) Prior Publication Data

US 2009/0267376 A1    Oct. 29, 2009

(51) Int. Cl.
*B60N 2/04* (2006.01)
(52) U.S. Cl. .................. 296/65.03; 439/34
(58) Field of Classification Search ............ 296/65.03, 296/65.01; 439/34; 248/503.1
See application file for complete search history.

(56) References Cited

U.S. PATENT DOCUMENTS

| 5,752,845 | A  | 5/1998  | Fu            |
| 6,050,835 | A  | 4/2000  | Henrion et al.|
| 6,250,703 | B1 | 6/2001  | Cisler et al. |
| 6,267,430 | B1 | 7/2001  | Cresseaux     |
| 6,279,981 | B1 | 8/2001  | Mesnage       |
| 6,343,939 | B1 | 2/2002  | Inoue         |
| 6,485,080 | B2 | 11/2002 | Hansen et al. |
| 6,578,912 | B2 | 6/2003  | Hansen et al. |
| 6,752,445 | B1 | 6/2004  | Koehler et al.|

FOREIGN PATENT DOCUMENTS

DE    19743313 C1    12/1998

*Primary Examiner*—Joseph D Pape
(74) *Attorney, Agent, or Firm*—Clark Hill PLC

(57) ABSTRACT

A vehicle seat assembly adapted to be removably coupled to a floor in a vehicle is provided. An electrical component is mounted to the seat assembly. A riser assembly is also mounted to the seat assembly. A first electrical connector is mounted to the riser assembly and electrically coupled to the electrical component. A second electrical connector is adapted to be mounted to the floor. The first electrical connector linearly slidingly engages the second electrical connector as the seat assembly is secured to the floor for electrically coupling the first electrical connector with a vehicle power source.

17 Claims, 6 Drawing Sheets

REMOVABLE POWER SEAT CONNECTOR

FIELD OF THE INVENTION

The invention relates to a seat assembly for an automotive vehicle. More particularly, the invention relates to a removable powered seat assembly.

DESCRIPTION OF RELATED ART

Automotive vehicles include seat assemblies for supporting an occupant within the vehicle. Typically, in vehicles such as SUVs and vans, second and third row seat assemblies are removable. These removable seat assemblies are well known in the art and are widely used.

Conventional, non-removable seat assemblies are commonly equipped with a variety of electrical components such as power ports, courtesy or task lighting, seatbelt indicators, seat heaters, seat ventilation, audio or video components, adjustable lumbar support, massage capabilities, occupant detection, integrated coolers, adjustment mechanisms (such as those which change seat height, tilt and horizontal positioning), seatbelt pretensioners, and communication systems. Seat assemblies of this type including a power seat adjuster, such as six-way power seat adjuster are disclosed in U.S. Pat. Nos. 5,014,958; 4,966,045; and 4,880,199.

While removable seat assemblies have been developed which include electrical components, these seat assemblies typically require a user to manually disconnect or uncouple electrical connectors or contacts when it is desired to remove the seat assemblies from the vehicle and then to reconnect or couple the electrical connectors or contacts when the seat assemblies are installed in the vehicle. If the user forgets to disconnect the electrical connectors before removing the seat assemblies, damage will result to the electrical connectors and/or wiring system.

Removable seat assemblies which include electrical components and do not require manual coupling and uncoupling of electrical connectors each time the seat assemblies are installed and removed from the vehicle are disclosed in U.S. Pat. Nos. 6,485,080 (the '080 patent) and 6,250,703 (the '703 patent). The '703 patent discloses a seat having a latching mechanism for removably coupling the seat to a floor. The latching mechanism includes a seat-mounted electrical connector which is a female-like socket connector and a vehicle-mounted electrical connector which is a male-like pin connector. As the latching mechanism pivots to a locked position securing the seat to the floor, the socket connector engages the pin connector. The pin connector is mounted flexibly to facilitate the mating of the pin connector to the socket connector even if the two connectors are not perfectly aligned when they come into contact.

The '080 patent discloses a seat having front and rear coupling members for removably coupling the seat to a floor of a vehicle. A vehicle electrical contact is a conductive strip located within a floor well. A seating electrical contact is provided at a location on one of the front coupling members placing it in engagement with the vehicle contact when the seat is in its installed and locked position. The seating contact is a cylindrical conductive rod which is spring loaded so that a wiping action occurs between a rod tip and the strip as the seat is rotated to a locked position securing the seat to the floor.

Consequently, it is desirable to provide a removable seat assembly utilizing a simplified and more robust system of electrical connectors or contacts that linearly slidingly engage and disengage during linear movement of the seat assembly into and out of the vehicle.

SUMMARY OF THE INVENTION

According to one aspect of the invention, a vehicle seat assembly adapted to be removably coupled to a floor in an automotive vehicle is provided. An electrical component is mounted to the seat assembly. A riser assembly is also mounted to the seat assembly. A first electrical connector is mounted to the riser assembly and electrically coupled to the electrical component. A second electrical connector is adapted to be mounted to the floor. The first electrical connector linearly slidingly engages the second electrical connector as the seat assembly is secured to the floor for electrically coupling the first electrical connector with a vehicle power source.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
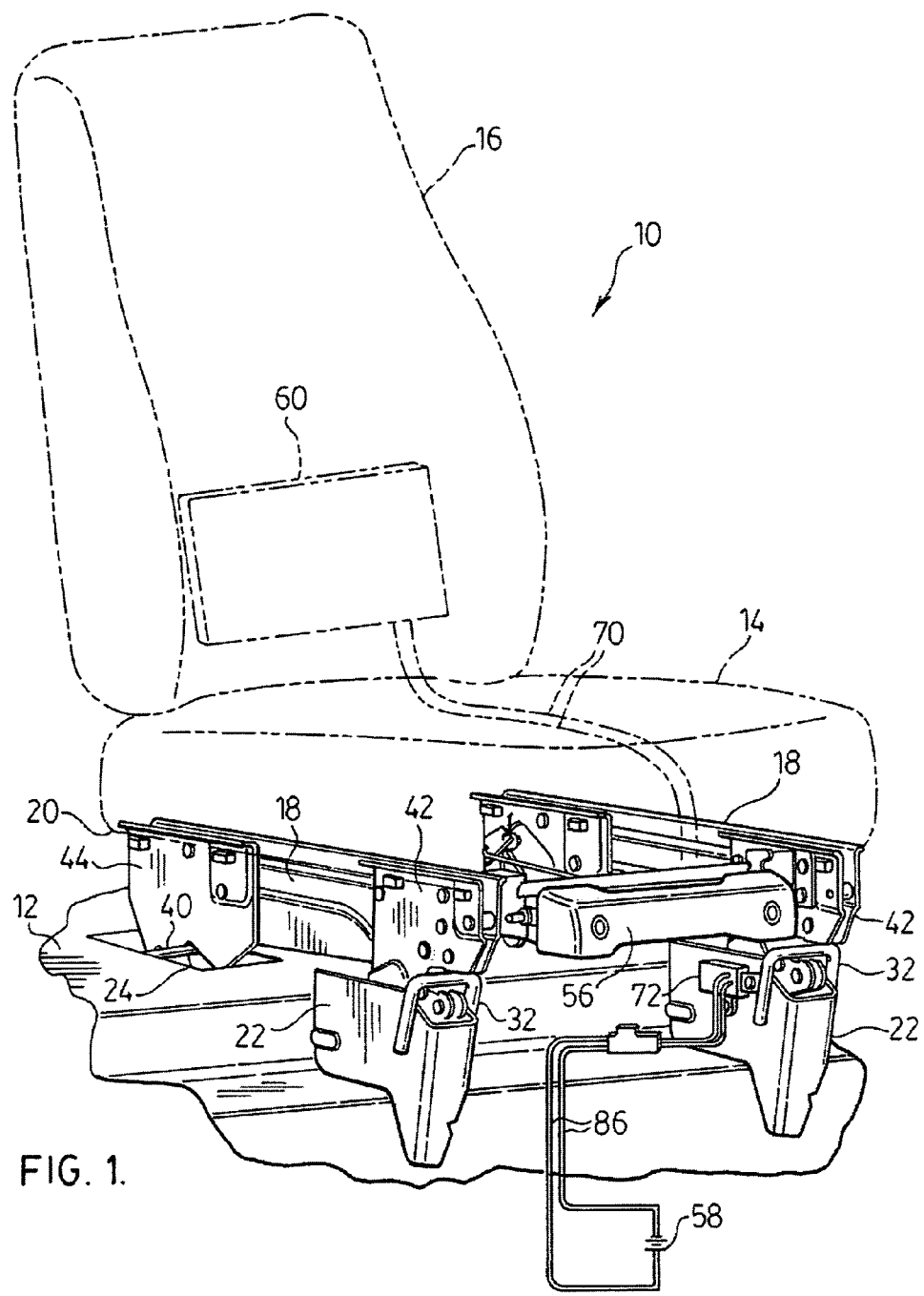
FIG. 1 is a front perspective view of a seat assembly removably coupled to a floor including an electrical component according to the invention.

Referring to FIG. 1, a seat assembly, generally shown at 10 is removably mounted to a floor 12 in an automotive vehicle (not shown). The seat assembly 10 includes a generally horizontal seat cushion 14 for supporting an occupant above the floor 12 and a seat back 16. The seat back 16 is pivotally coupled to the seat cushion 14 for providing selective angular adjustment of the seat back 16 between a plurality of reclined seating positions. In addition, the seat back 16 is moveable to a forwardly folded flat position overlying the seat cushion 14 for extending the cargo carrying capacity of the vehicle or to assist a user with removal of the seat assembly 10 from the vehicle.

A pair of laterally spaced apart riser assemblies 18 is fixedly secured to an underside 20 of the seat cushion 14 and is adapted for removably coupling the seat assembly 10 to the floor 12. As shown in FIG. 1, a pair of laterally spaced apart front wells 22 and a pair of laterally spaced apart rear wells 24 (one shown) are provided for mounting the seat assembly 10 to the floor 12.

Figure 2:
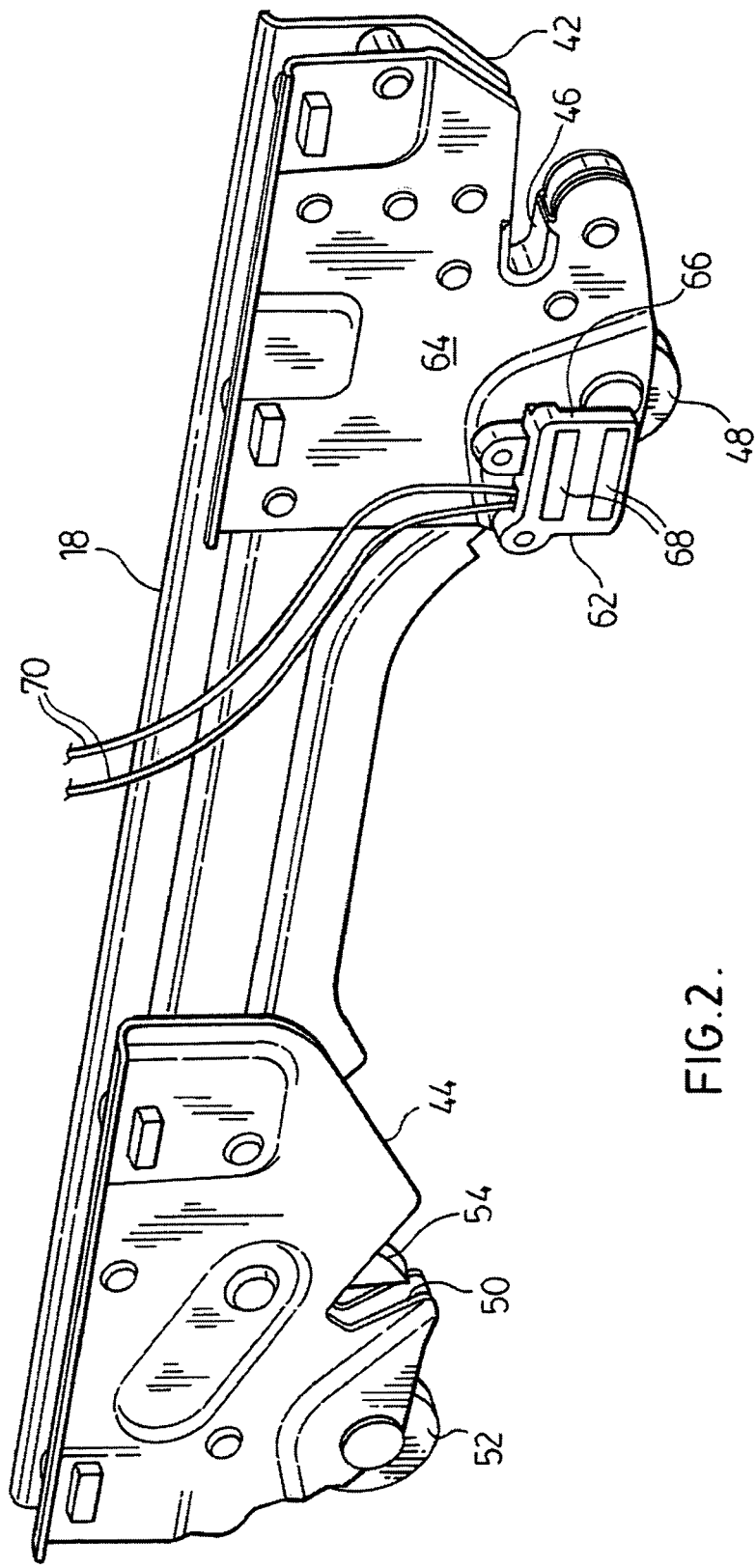
FIG. 2 is an enlarged, perspective view of a riser assembly including a first electrical connector.
Figure 3:
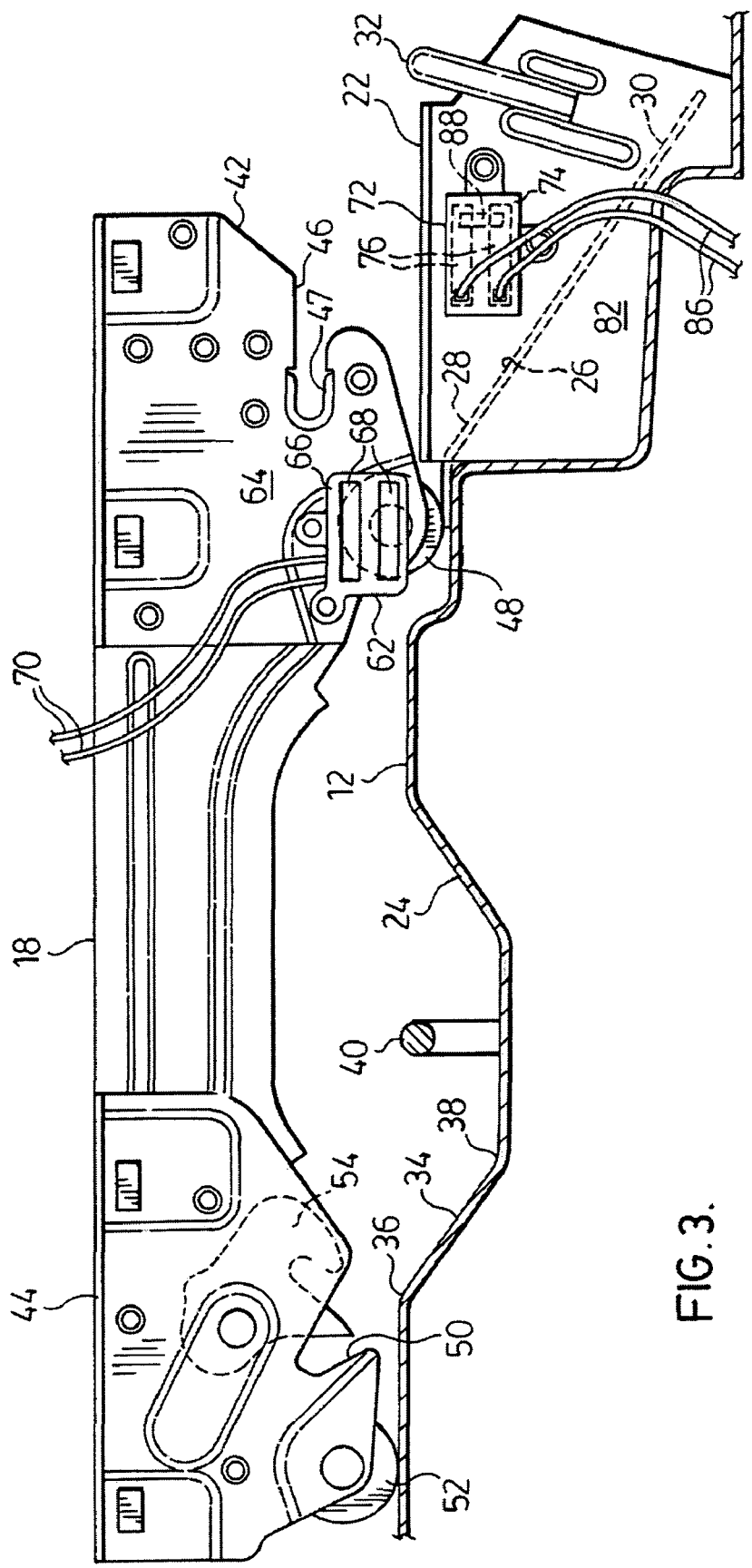
FIG. 3 is an enlarged, side view of the riser assembly away from front and rear striker bars.
Figure 5:
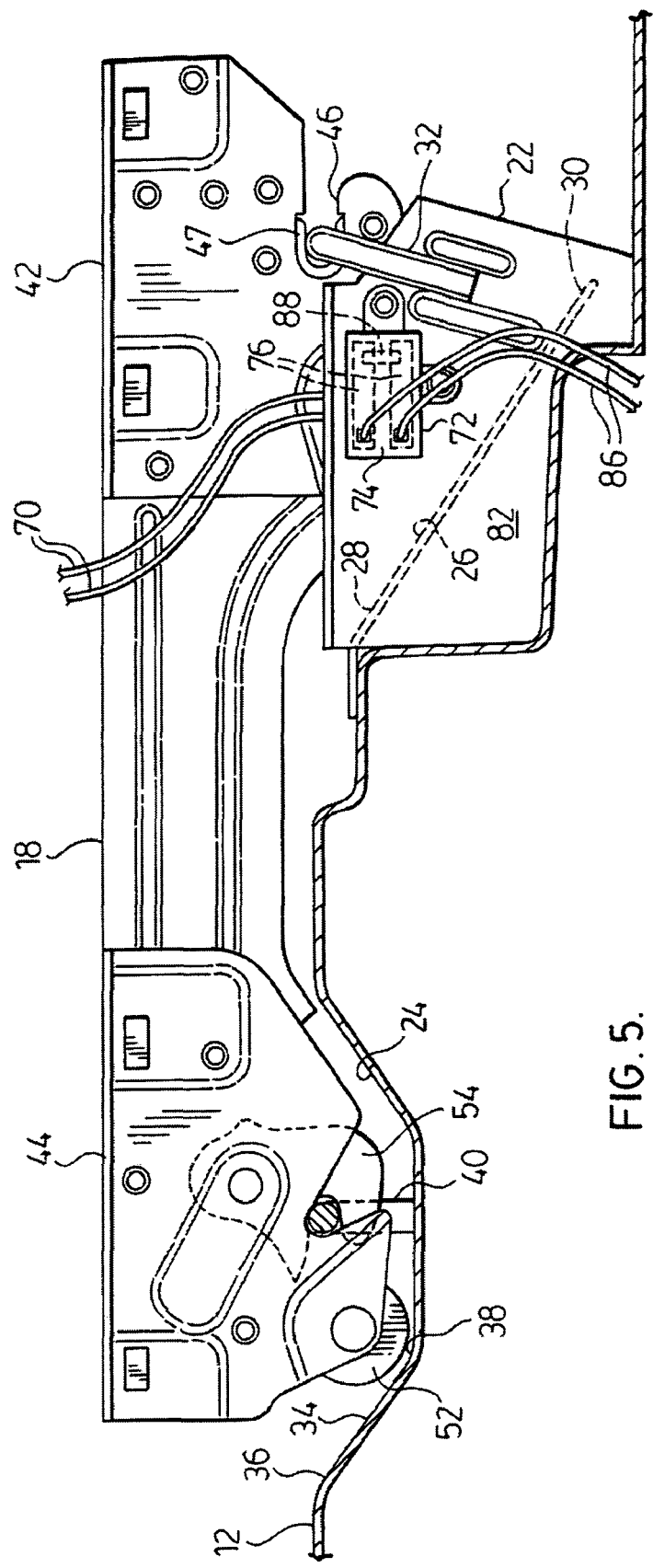
FIG. 5 is an enlarged, side view of the riser assembly secured to the front and rear striker bars.
Figure 6:
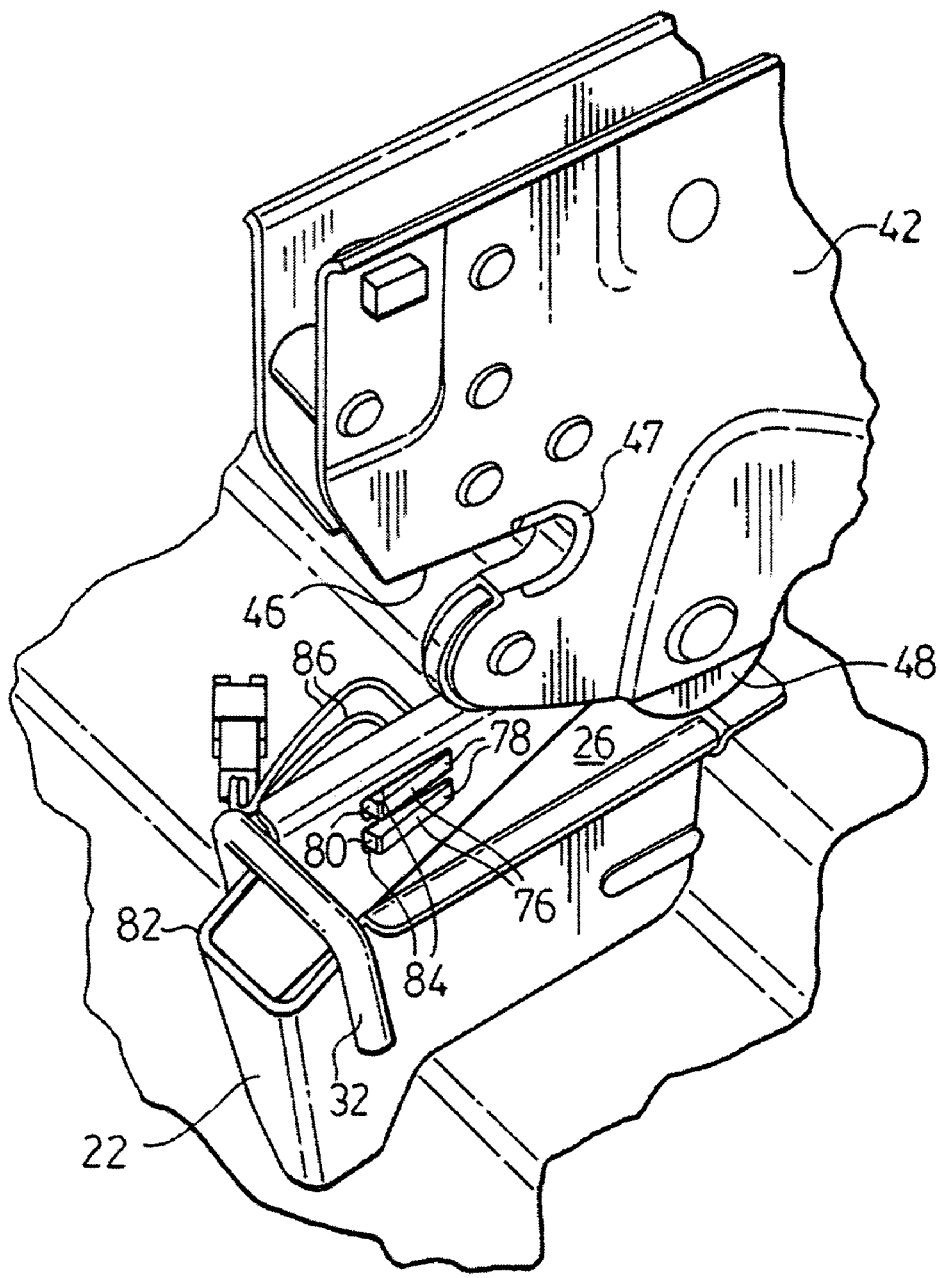
FIG. 6 is an enlarged, fragmentary, perspective view of a front well including a pair of contacts of a second electrical connector.

Referring to FIG. 2, each riser assembly 18 includes a front latching mechanism 42 and a rear latching mechanism 44 mounted thereon for engagement with the front 32 and rear 40 striker bars, respectively, to secure the seat assembly 10 to the floor 12. More specifically, the front latching mechanism 42 includes a forwardly facing U shaped channel or fishmouth 46 for receiving the front striker bar 32 therein. Each U shaped channel 46 has a resilient sleeve 47 at the bight of the U shape. A front wheel 48 is rotatably coupled and extends downward from the front latching mechanism 42. The rear latching mechanism 44 includes a downwardly and forwardly facing U shaped channel or fishmouth 50 for receiving the rear striker bar 40 therein. A back wheel 52 is rotatably coupled and extends downward of the rear latching mechanism 44. A latch 54 is pivotally coupled to the rear latching mechanism 44 and cooperates with the U shaped channel 50 and is operable between a locked condition, as shown in FIG. 5, engaged with the rear striker bar 40, and an unlocked condition, as shown in FIG. 3, disengaged from the rear striker bar 40.

Referring again to FIG. 1, a towel bar 56 disposed between the riser assemblies 18 is operatively coupled to both latches 54 for actuating simultaneously the latches 54 from the locked condition to the unlocked condition as is well known in the art. It will be appreciated that the latches 54 can be actuated between the locked and unlocked conditions by any of a variety of methods such as by a release handle, a cable assembly and lever, or the like, without varying from the scope of the invention.

Referring to FIGS. 3 through 6, each of the front wells 22 disposed in the floor 12 include a ramped surface 26 for guiding the seat assembly 10 into position within the vehicle to be secured to the floor 12. The ramped surface 26 descends from a rearward end 28 to a forward end 30 within the front well 22. Each of the front wells 22 include an inverted, U-shaped front striker bar 32, extending transversely across the well 22. The front striker bars 32 are fixedly secured at opposite ends thereof to the front well 22 or the floor 12 by fasteners, welding, or any suitable means. Preferably, the front striker bars 32 are disposed below the surface of the floor 12.

Each of the rear wells 24, disposed in the floor 12 rearward of the front wells 22, include a ramped surface 34 for guiding the seat assembly 10 into the proper position within the vehicle to be secured to the floor 12. The ramped surface 34 descends from a rearward end 36 to a bottom surface 38 within the rear well 24. Preferably, ramped surface 34 is parallel to the ramped surface 26 of the front wells 22. Each of the rear wells 24 include an inverted, U-shaped rear striker bar 40, extending transversely across the well 24. The rear striker bars 40 are fixedly secured at opposite ends thereof to the rear well 24 or the floor 12 by fasteners, welding, or any suitable means. Preferably, the rear striker bars 40 are disposed below the surface of the floor 12.

Referring to FIGS. 1 and 2, a first electrical connector 62, preferably mounted to the seat assembly 10, is fixedly secured to an inboard side 64 of one of the front latching mechanisms 42 and is disposed proximate the front wheel 48. The first connector 62 comprises a housing 66 having a pair of spaced apart contacts 68 disposed longitudinally therein. The contacts 68 are mounted flush with the mounting bracket 66 such that each is exposed but do not protrude therefrom. While the present embodiment shows the first connector 62 mounted to the inboard side 64 of one of the front latching mechanisms 42, the first connector 62 could be mounted to an outboard side or on one of the rear latching mechanisms 44 without varying from the scope of the invention. The contacts 68 are connected to the electrical component 60 mounted within the seat assembly 10 by a pair of electrical wires 70. The electrical component 60, represented schematically by hidden lines, could be any of a variety of electrical components such as a power port, courtesy or task lighting, a seatbelt indicator, a seat heater, seat ventilation, audio or video components, adjustable lumbar support, massage capabilities, occupant detection, a seat adjustment mechanism, a seatbelt pretensioner and a communication system without varying from the scope of the invention Referring to FIGS. 1, 3 to 6, a second electrical connector 72, preferably mounted to the vehicle, is fixedly secured to the front well 22 corresponding to the front latching mechanism 42 having the first connector 62 fixedly secured thereto. The second connector 72 comprises a housing 74 having a pair of spaced apart contacts 76 disposed longitudinally therein. The contacts 76 are pivotally coupled at a first end 78 to the mounting bracket 74 and are spring-biased such that a second end 80 protrudes laterally outward therefrom to a presentation position. In the preferred embodiment, the second connector 72 is mounted to an inboard side wall 82 of the front well 22 with the contacts 76 extending through a pair of apertures 84 into the front well 22 such that the contacts 76 are in facing relationship with the contacts 68 of the first connector 62. While the present embodiment shows the second connector 72 mounted to the inboard side wall 82 of the front well 22, the second connector 72 could be mounted to an outboard side wall of the front well 22 or any side wall of one of the rear wells 24 without varying from the scope of the invention. The contacts 76 are connected to the vehicle power source 58 by a pair of electrical wires 86. While in the embodiment shown the contacts 76 of the second connector 72 are spring-biased, it will be appreciated that in an alternative embodiment the contacts 68 of the first connector 62 could be spring-biased without varying from the scope of the invention.

Typically, the seat assembly 10 is installed into the vehicle by rolling the seat assembly 10 along the floor 12, and inserting the front 42 and rear 44 latching mechanisms into the front wells 22 and the rear wells 24 until each engages with the front 32 and rear 40 striker bars, respectively. More specifically, the front wheels 48 rollingly engage the ramped bottom surface 26 of the front wells 22 thereby guiding the seat assembly 10 such that the U shaped channel 46 of each of the front latching mechanisms 42 receives one of the front striker bars 32 therein. At the same time, the back wheels 52 rollingly engage the ramped surface 34 of the rear wells 24 thereby guiding the seat assembly 10 such that the U shaped channel 50 of each of the rear latching mechanisms 44 receives one of the rear striker bars 40 therein. As the U shaped channel 50 of each of the rear latching mechanisms 44 receives one of the rear striker bars 40, the latches 54 actuate from the unlocked condition, shown in FIG. 3, to the locked condition, shown in FIG. 5, securing the seat assembly 10 to the floor 12.

An electrical connection is automatically established between a vehicle power source 58 and one or more electrical components 60 mounted on or within the seat assembly 10 as the seat assembly 10 is rollingly guided forwardly in a latching direction and secured to the floor 12. The electrical connection is made without requiring the user to independently attach or connect the power source 58 to the seat assembly 10 after the seat assembly 10 is installed. Similarly, the electrical connection does not require the user to independently detach or disconnect the power source 58 from the seat assembly 10 when it is desired to remove the seat assembly 10 from the vehicle.

In the embodiment shown, as the seat assembly 10 is guided into a position wherein the seat assembly 10 is secured to the floor 12, the front 48 and back 52 wheels rollingly engage the ramped surface 26, 34 of the respective front 22 and rear 24 wells until the contacts 68 of the first connector 62 is vertically aligned with the contacts 76 of the second connector 72. In this position, the rear wheels 52 support the rearwardly portion of the seat assembly 10, while the U shaped channels 46 of the front latching mechanisms 42 rests upon the forward strikers 32. As the seat assembly 10 is moved forwardly to latch the seat assembly 10 to the floor 12, the contacts 68 of the first connector 62 linearly slide amd engage the contacts 76 of the second connector 72 to automatically establish the electrical connection between the vehicle power source 58 and the electrical component 60. Because the contacts 76 of the second connector 72 are spring-biased they compress laterally inward, toward the mounting bracket 74, when slidingly engaged by the contacts 68 of the first connector 62. This freedom to compress prolongs part life and ensures good electrical contact between the first connector 62 and second connector 72, even after many removals and installations of the seat assembly 10.

Figure 4:
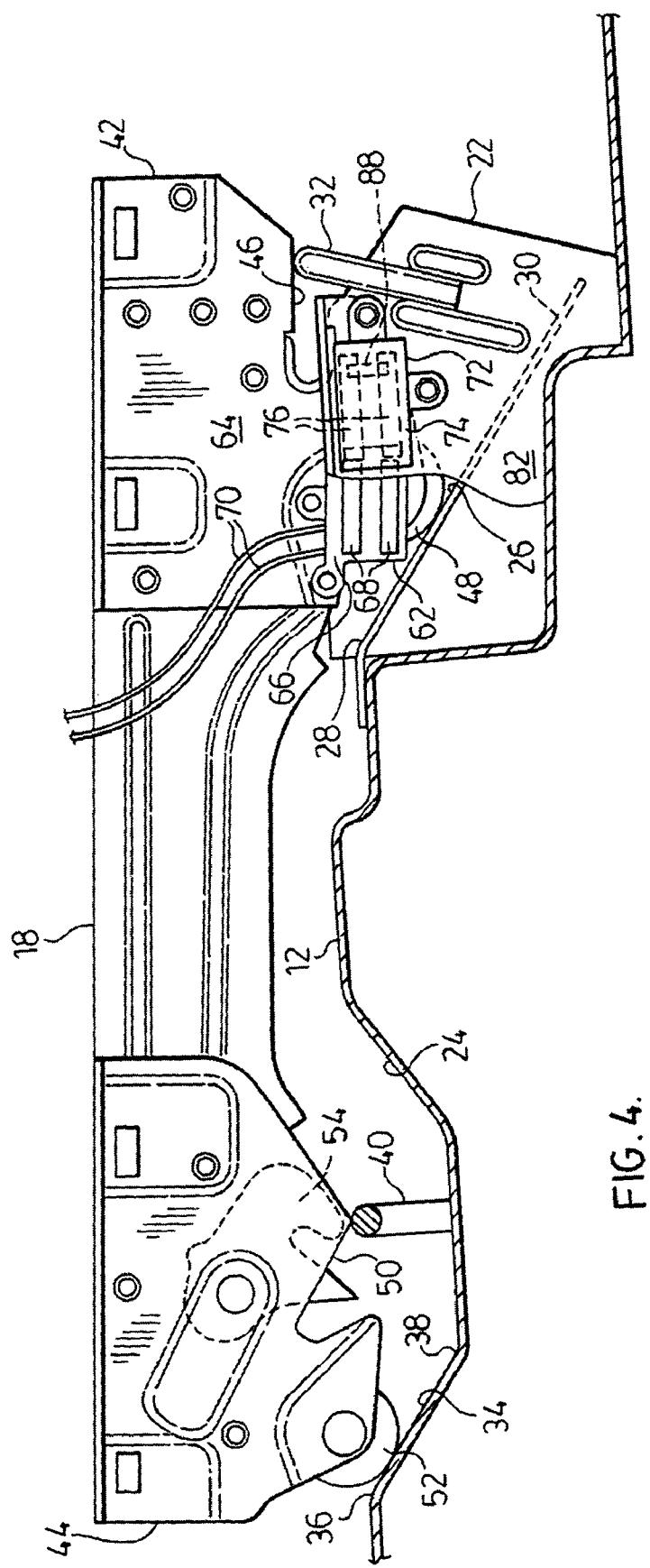
FIG. 4 is an enlarged, side view of the riser assembly engaging the front and rear striker bars.

Preferably, the second connector 72 additionally includes a switch 88 disposed therein, as shown in FIGS. 3 through 5. The switch 88 is normally open such that accidental contact with the contacts 76 of the second connector 72 does not establish the electrical connection to the vehicle power source 58. When the seat assembly 10 is secured to the floor 12, the contacts 68 of the first connector 62 compress the contacts 76 of the second connector 72, thereby closing the switch 88 and establishing the electrical connection to the vehicle power source 58.

To remove the seat assembly 10 from the vehicle, the towel bar 56 is lifted to actuate the latches 54 from the locked condition to the unlocked condition. Once the latches 54 are in the unlocked condition, the front 48 and back 52 wheels enable the seat assembly 10 to be rollingly moved rearward such that the front 42 and rear 44 latching mechanisms are away from the front 32 and rear 40 striker bars, thereby allowing the seat assembly 10 to be lifted out of the vehicle.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A vehicle seat assembly adapted to be removably mounted to a floor of a vehicle comprising:
   an electrical component mounted to said seat assembly;
   a riser assembly mounted to said seat assembly;
   a first electrical connector mounted to said riser assembly and electrically coupled to said electrical component;
   a second electrical connector adapted to be mounted to the floor and wherein said first electrical connector linearly and slidingly engages said second electrical connector as said seat assembly is moved linearly, latching the seat assembly to the floor and electrically coupling said electrical component with a vehicle power source.

2. A vehicle seat assembly as set forth in claim 1 wherein said riser assembly and said floor are complementary configured and cooperate to align said first electrical connector and said second electrical connector and guide said seat assembly into position to be latched to the floor.

3. A vehicle seat assembly as set forth in claim 2 wherein said floor is configured to receive said riser assembly within wells, each of said wells having a ramped surface, said riser traveling along said ramped surface to vertically align said first electrical connector and said second electrical connector.

4. A vehicle seat assembly as set forth in claim 3 wherein said second electrical connector is mounted within one of said wells.

5. A vehicle seat assembly as set forth in claim 4 wherein at least one of said first and second electrical connectors is spring-biased to a presentation position that compress during linear sliding engagement of said first and second electrical connectors.

6. A vehicle seat assembly as set forth in claim 5 wherein at least one of said first and second electrical connectors include a switch, said switch activated by compressing said at least one of said first and second electrical connectors inward to electrically couple said electrical component with said vehicle power source.

7. A vehicle seat assembly as set forth in claim 2, wherein said riser assembly has a plurality of wheels enabling said seat assembly to be rolled along a surface.

8. A vehicle seat assembly as set forth in claim 7, wherein said floor is configured to have a plurality of wells, each well having a ramp surface to rollingly receive said plurality of wheels.

9. A vehicle seat assembly as set forth in claim 8, wherein each of said ramp surfaces are inclined at an angle relative to the floor of the vehicle.

10. A vehicle seat assembly as set forth in claim 9, wherein each of said wells has a striker that engages said riser assembly.

11. A vehicle seat assembly as set forth in claim 10, wherein said seat riser assembly is configured to latch onto a rear pair of strikers and is slidingly supported by a forward pair of strikers.

12. A vehicle seat assembly as set forth in claim 11, wherein said seat riser assembly has a pair of forwardly extending U shaped channels that cooperates with the forward pair of strikers.

13. A vehicle seat assembly as set forth in claim 12, wherein said forwardly extending U shaped channels has a resilient sleeve positioned to engage said strikers when said seat assembly is fully latched to said floor.

14. A vehicle seat assembly as set forth in claim 13, wherein said seat riser assembly has a pair of rearward latches that selectively engage said rear pair of strikers.

15. A vehicle seat assembly as set forth in claim 14, wherein said seat assembly further comprises a towel bar pivotally mounted to said seat riser assembly, said towel bar operatively connected to said pair of rearward latches and upon manual manipulation effects said pair of rearward latches to unlatch, enabling said seat assembly to be unlatched and removed from floor.

16. A vehicle seat assembly as set forth in claim 15 wherein at least one of said first and second electrical connectors is spring-biased to a presentation position that compress during linear sliding engagement of said first and second electrical connectors.

17. A vehicle seat assembly as set forth in claim 16 wherein at least one of said first and second electrical connectors include a switch, said switch activated by compressing said at least one of said first and second electrical connectors inward to electrically couple said electrical component with said vehicle power source.

* * * * *